(12) United States Patent
Chien et al.

(10) Patent No.: US 11,644,739 B2
(45) Date of Patent: May 9, 2023

(54) PROJECTOR WITH PREFERRED LIGHTING UNIFORMITY

(71) Applicant: QISDA CORPORATION, Taoyuan (TW)

(72) Inventors: Chih-Shiung Chien, Taoyuan (TW); Ming-Kuen Lin, Taoyuan (TW); Tsung-Hsun Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/352,391

(22) Filed: Jun. 21, 2021

(65) Prior Publication Data

US 2022/0004093 A1 Jan. 6, 2022

(30) Foreign Application Priority Data

Jul. 2, 2020 (CN) .......................... 202010634694.X

(51) Int. Cl.
*G03B 33/12* (2006.01)
*G03B 21/20* (2006.01)

(52) U.S. Cl.
CPC ........... *G03B 33/12* (2013.01); *G03B 21/204* (2013.01); *G03B 21/2066* (2013.01)

(58) Field of Classification Search
None
See application file for complete search history.

(56) References Cited

U.S. PATENT DOCUMENTS

2019/0384149 A1\* 12/2019 Tsai .................... G03B 21/2066
2020/0333696 A1\* 10/2020 Lin ...................... G02B 27/141

FOREIGN PATENT DOCUMENTS

| CN | 110477874 A | \* | 11/2019 |
| CN | 110568706 A |   | 12/2019 |
| CN | 110596999 A |   | 12/2019 |

\* cited by examiner

*Primary Examiner* — Sultan Chowdhury
*Assistant Examiner* — Danell L Owens

(57) ABSTRACT

A projector includes a light source module, a collimator lens module, a wavelength conversion module, a first dichroic unit and a second dichroic unit. The light source module provides a first beam. The collimator lens module has a first part and a second part. The first beam passes the first part. The wavelength conversion module receives the first beam and includes a reflecting plate and a wavelength conversion layer. The first dichroic unit reflects the first beam. The reflecting plate reflects the first beam to generate a second beam passing the second part. The wavelength conversion layer is excited by the first beam to generate a third beam. The second dichroic unit allows passing of the third beam and a part of the second beam to generate a fourth beam, and reflects the other part of the second beam to generate a fifth beam.

20 Claims, 4 Drawing Sheets

PROJECTOR WITH PREFERRED LIGHTING UNIFORMITY

BACKGROUND OF THE INVENTION

1. Field of the Invention

The present invention relates to a projector, and more particularly, to a projector with preferred lighting uniformity.

2. Description of the Prior Art

The conventional laser projector utilizes the blue light laser source to provide the illumination beam. The illumination beam is transformed into an excitation beam with different color via the wavelength conversion device (such as the color wheel partly covered by phosphor powder or quantum dot material); then, the excitation beam is mixed with the illumination beam for related application. The conventional alignment module utilizes the dichroic component to reflect the illumination beam toward the color wheel via a part of the collimator lens. A portion of the color wheel made by wavelength conversion material generates the excitation beam accordingly, and the excitation beam is directly projected onto the light receiver via the collimator lens. Besides, a part of the illumination beam passes through another portion of the color wheel without wavelength conversion function and is projected onto the light receiver via the other part of the collimator lens, and then mixed with the excitation beam. In the conventional laser projector, the illumination beam and the excitation beam are difficult to well mix, and a projection picture of the conventional laser projector cannot provide preferred color uniformity.

SUMMARY OF THE INVENTION

The present invention provides a projector with preferred lighting uniformity for solving above drawbacks.

According to the claimed invention, a projector includes a light source, a collimator lens module, a wavelength conversion module, a first dichroic unit and a second dichroic unit. The light source is adapted to emit a first beam. The collimator lens module has a first part and a second part divided by an axle, and the first beam passes through the first part. The wavelength conversion module is adapted to receive the first beam from the first part. The wavelength conversion module has a reflecting plate and a wavelength conversion layer, and the wavelength conversion layer is an annular structure disposed on the reflecting plate. The first dichroic unit is disposed on position corresponding to the first part of the collimator lens module. The first dichroic unit is adapted to reflect the first beam toward the reflecting plate or the wavelength conversion layer via the first part. The reflecting plate is adapted to reflect the first beam for generating a second beam passing through the second part, and the wavelength conversion layer is adapted to be excited by the first beam for generating a third beam passing through the first part and the second part of the collimator lens module and the first dichroic unit. The second dichroic unit is disposed on position corresponding to the second part of the collimator lens module. The second dichroic unit is adapted to allow passing of the third beam and a part of the second beam for generating a fourth beam, and further to reflect the other part of the second beam for generating a fifth beam. The fifth beam is reflected by the first dichroic unit.

The projector of the present invention can utilize the first dichroic unit to project the illumination beam (which means the first beam) of the light source onto the wavelength conversion module via the first part of the collimator lens module; although the excitation beam (which means the third beam) excited by the wavelength conversion module can pass through the first part and the second part of the collimator lens module, the reflection beam (which means the second beam) can only pass through the second part of the collimator lens module. Therefore, the projector can further utilize the second dichroic unit to divide the blue light (which means the second beam only passing through the second part of the collimator lens module) into the fourth beam and the fifth beam, and then the fourth beam and the fifth beam can be mixed with the yellow light (which means the third beam passing through the first part and the second part of the collimator lens module). The present invention can adequately mix the blue light and the yellow light to effectively increase intensity uniformity of a projection picture of the projector.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
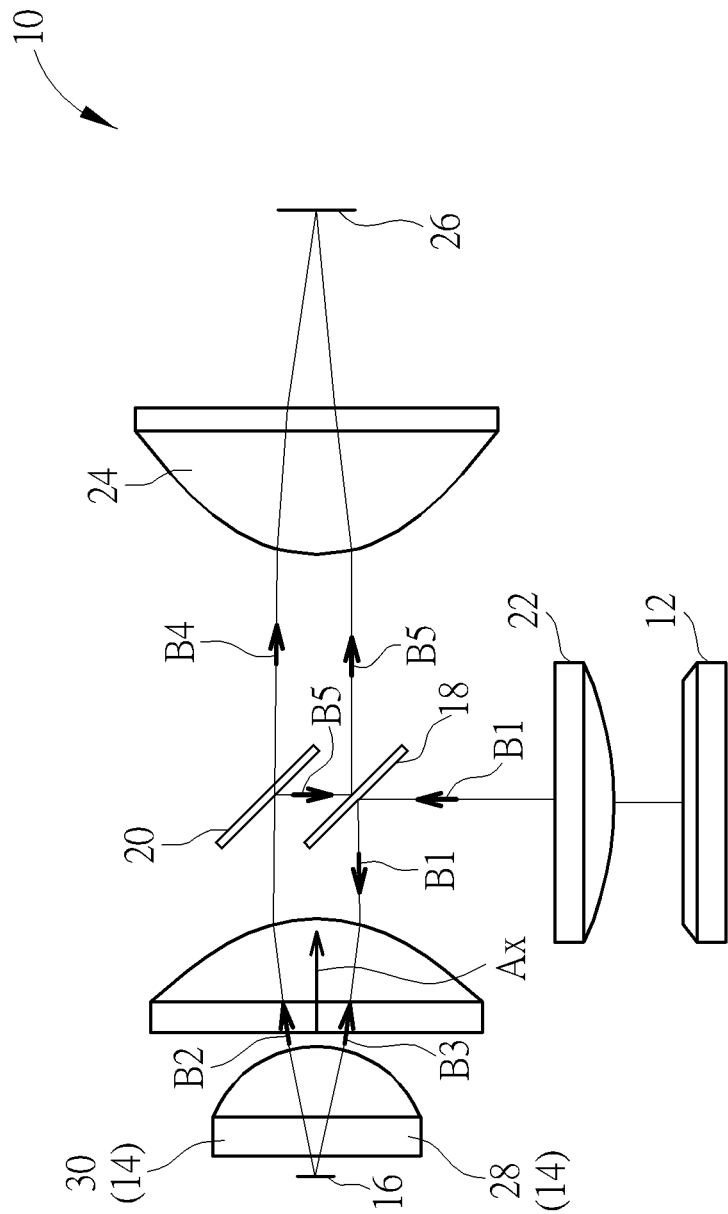
FIG. 1 is a diagram of a projector according to an embodiment of the present invention.

Please refer to FIG. 1. FIG. 1 is a diagram of a projector 10 according to an embodiment of the present invention. The projector 10 can include a light source 12, a collimator lens module 14, a wavelength conversion module 16, a first dichroic unit 18, a second dichroic unit 20, a first light condensing module 22, a second light condensing module 24 and a light receiver 26. The collimator lens module 14 can include at least one aspheric mirror, such as an aspheric mirror, or a combination of the aspheric mirror and a spherical mirror. Lens assembly of the collimator lens module 14 is not limited to the embodiment shown in FIG. 1, and depends on a design demand. The collimator lens module 14 can be disposed between the wavelength conversion module 16 and the dichroic units 18 and 20. The collimator lens module 14 can include a first part 28 and a second part 30 divided by an axle Ax, and the axle Ax can be a central axle of the collimator lens module 14.

Figure 2:
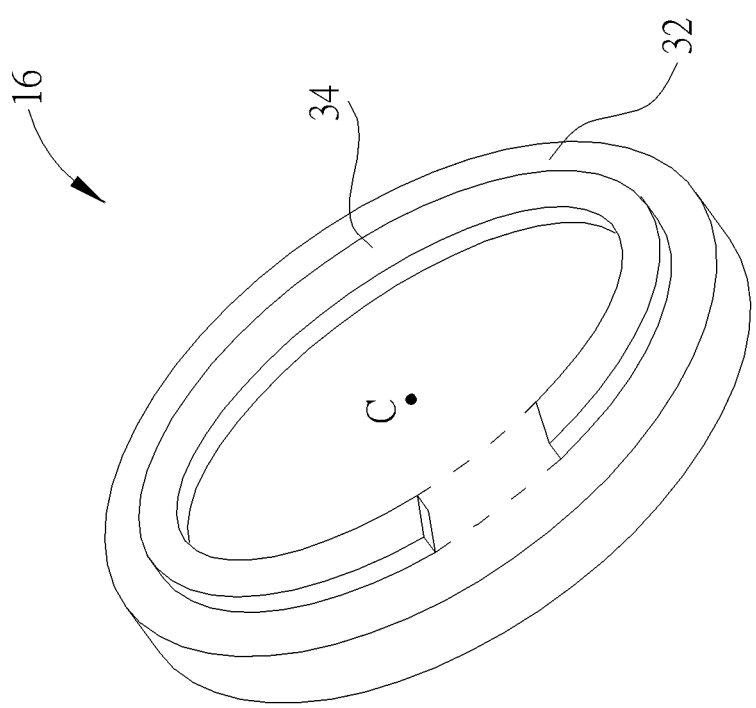
FIG. 2 is a diagram of a wavelength conversion module according to the embodiment of the present invention.

Please refer to FIG. 1 and FIG. 2. FIG. 2 is a diagram of the wavelength conversion module 16 according to the embodiment of the present invention. The wavelength conversion module 16 can include a reflecting plate 32 and a wavelength conversion layer 34. The wavelength conversion layer 34 can be an annular structure, and the annular structure can be disposed around a center C of the reflecting plate 32. The reflecting plate 32 and the wavelength conversion layer 34 can be revolved on the center C, so that an illumination beam emitted by the light source 12 can be alternately projected onto the reflecting plate 32 and the wavelength conversion layer 34. Therefore, the reflecting plate 32 can directly reflect the illumination beam of the light source 12, and the wavelength conversion layer 34 can be excited by a beam with a specific wavelength or waveband for generating a beam with other wavelength or waveband.

The first dichroic unit 18 can be a dichroic lens disposed on position close to the light source 12, such as somewhere corresponding to the first part 28 of the collimator lens module 14. The second dichroic unit 20 can be another dichroic lens disposed on position away from the light source 12, such as somewhere corresponding to the second part 30 of the collimator lens module 14. The first dichroic unit 18 can reflect the beam with the specific wavelength or waveband, and allow passing of the beam with other wavelength or waveband. The second dichroic unit 20 can reflect a part of the beam with the specific wavelength or waveband and allow the other part of the beam with the specific wavelength or waveband to pass, and further allow passing of the beam with other wavelength or waveband. The first light condensing module 22 can be disposed between the light source 12 and the first dichroic unit 18. The second light condensing module 24 can be disposed between the light receiver 26, the first dichroic unit 18 and the second dichroic unit 20.

The light source 12 can emit a first beam B1; generally, the first beam B1 can be blue light. A projection dimension of the first beam B1 can be condensed when the first beam B1 passes through the first light condensing module 22, and then the first beam B1 can be projected onto the first dichroic unit 18. The first dichroic unit 18 can reflect the first beam B1, and then the first beam B1 can pass through the first part 28 of the collimator lens module 14 toward the wavelength conversion module 16. If the first beam B1 is projected onto the reflecting plate 32 of the wavelength conversion module 16, the reflecting plate 32 can reflect the first beam B1 to form a second beam B2. If the first beam B1 is projected onto the wavelength conversion layer 34 of the wavelength conversion module 16, the wavelength conversion layer 34 can be excited by the first beam B1 to form a third beam B3. In the embodiment of the present invention, the second beam B2 can be the blue light and the third beam B3 can be yellow light; however, color of the second beam B2 and the third beam B3 is not limited to the above-mentioned embodiment, and depends on an actual demand.

The second beam B2 can pass through the second part 30 of the collimator lens module 14 to be projected onto the second dichroic unit 20. The third beam B3 can pass through the first part 28 and the second part 30 of the collimator lens module 14, and be projected onto the first dichroic unit 18 and the second dichroic unit 20. The second dichroic unit 20 can allow passing of the third beam B3 (such as the yellow light) and the part of the second beam B2 (such as the blue light) to form a fourth beam B4, and further can reflect the other part of the second beam B2 to form a fifth beam B5. The fifth beam B5 (such as the blue light) can be reflected by the first dichroic unit 18 and mixed with a part of the third beam B3 (such as the yellow light). Then, the light receiver 26 can receive the third beam B3, the fourth beam B4 and the fifth beam B5 for generating a hybrid beam, and the hybrid beam having uniform intensity can be guided to other components for related application.

Figure 3:
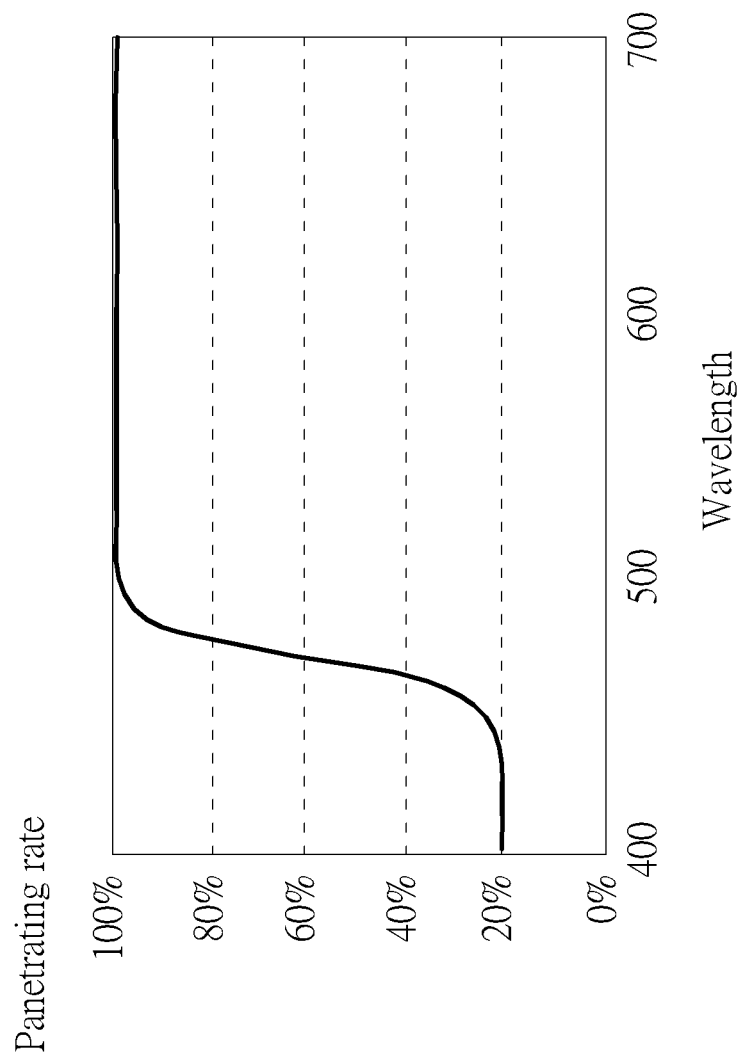
FIG. 3 is a diagram of showing relation between the wavelength and a penetrating rate of a second dichroic unit according to the embodiment of the present invention.

Please refer to FIG. 3. FIG. 3 is a diagram of showing relation between the wavelength and a penetrating rate of the second dichroic unit 20 according to the embodiment of the present invention. The second dichroic unit 20 can allow a first proportion of the second beam B2 to pass, and reflect a second proportion of the second beam B2. The first proportion may be the same as or different from the second proportion. For example, the embodiment of the present invention may allow a fifty percent of the second beam B2 to pass through the second dichroic unit 20, and the other fifty percent of the second beam B2 can be reflected by the second dichroic unit 20, which means the first proportion is the same as the second proportion; however, other possible embodiment may allow a thirty percent of the second beam B2 to pass through the second dichroic unit 20, and a seventy percent of the second beam B2 can be reflected by the second dichroic unit 20, which means the first proportion is different from the second proportion.

In the embodiment shown in FIG. 1, the first dichroic unit 18 and the second dichroic unit 20 can be two independent optical components; it should be mentioned that a normal planar vector of the first dichroic unit 18 preferably can be parallel to a normal planar vector of the second dichroic unit 20, or an included angle between the normal planar vectors of the first dichroic unit 18 and the second dichroic unit 20 can be smaller than a predefined angle. The predefined angle can be five or ten degrees, which may be varied according to a reflection angle of the blue light and/or an excitation angle of the yellow light. The projector 10 can utilize the first dichroic unit 18 to reflect the first beam B1 for being projected onto the wavelength conversion module 16. The second beam B2 reflected by the reflecting plate 32 of the wavelength conversion module 16 can only pass through the second part 30 of the collimator lens module 14, so that the second beam B2 can be divided into the fourth beam B4 (which passes through the second dichroic unit 20) and the fifth beam (which is reflected by the second dichroic unit 20) via the second dichroic unit 20, and thus the blue light can pass through an upper portion and a lower portion of the second light condensing module 24. In addition, the third beam B3 excited by the wavelength conversion layer 34 of the wavelength conversion module 16 can directly pass through the first part 28 and the second part 30 of the collimator lens module 14, and further through the first dichroic unit 18 and the second dichroic unit 20, so that the yellow light can pass through the upper portion and the lower portion of the second light condensing module 24.

Figure 4:
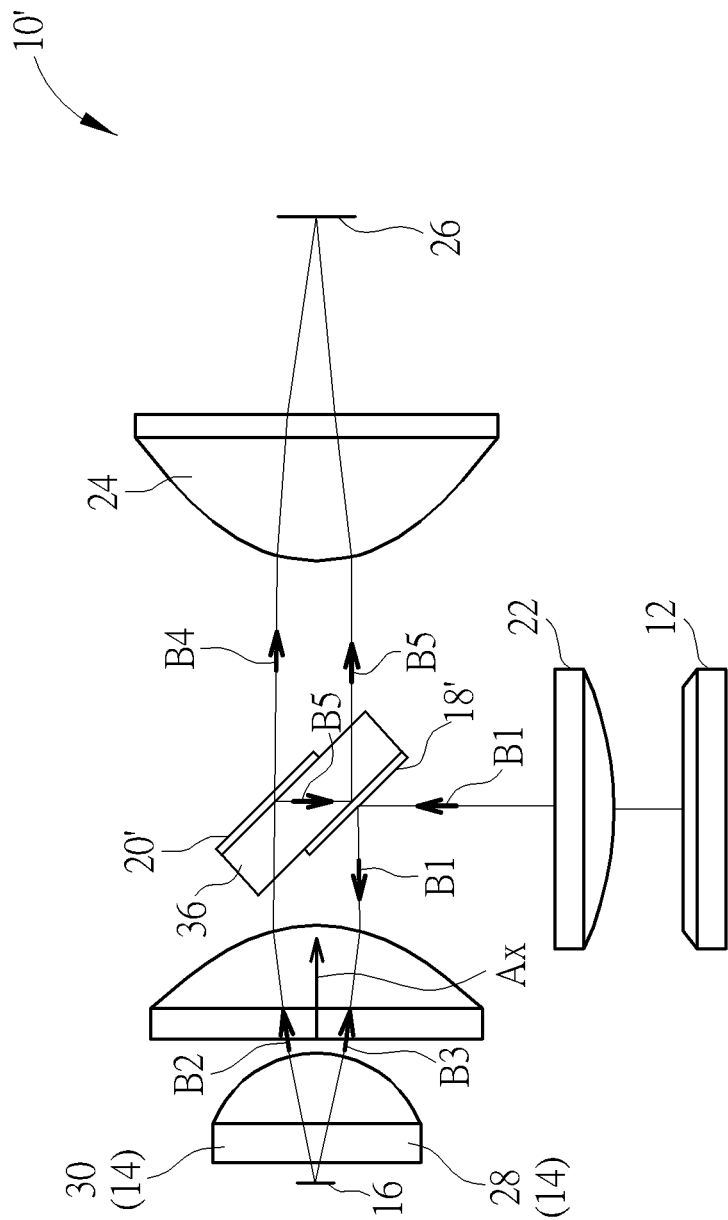
FIG. 4 is a diagram of the projector according to another embodiment of the present invention.

Please refer to FIG. 4. FIG. 4 is a diagram of the projector 10' according to another embodiment of the present invention. In the embodiment, elements having the same numerals as one of the foresaid embodiment have the same structures and functions, and a detailed description can be omitted herein for simplicity. The projector 10' of the embodiment can further include an optical component 36 disposed between the collimator lens module 14, the first light condensing module 22 and the second light condensing module 24. The first dichroic unit 18' and the second dichroic unit 20' may be coating, thin films or lenses with specific optical property respectively painted or installed on two opposite surfaces of the optical component 36. The first dichroic unit 18' can reflect the first beam B1 (such as the blue light) and the fifth beam B5 (such as the blue light), and allow passing of the third beam B3 (such as the yellow light). The second dichroic unit 20' can reflect a part of the second beam B2 (such as the blue light) and allow the other part of the second beam B2 to pass, and further allow passing of the third beam B3 (such as the yellow light).

In conclusion, the projector of the present invention can utilize the first dichroic unit to project the illumination beam (which means the first beam) of the light source onto the wavelength conversion module via the first part of the collimator lens module; although the excitation beam (which means the third beam) excited by the wavelength conversion module can pass through the first part and the second part of the collimator lens module, the reflection beam (which means the second beam) can only pass through the second part of the collimator lens module. Therefore, the projector can further utilize the second dichroic unit to divide the blue light (which means the second beam only passing through the second part of the collimator lens module) into the fourth beam and the fifth beam, and then the fourth beam and the fifth beam can be mixed with the yellow light (which means the third beam passing through the first part and the second part of the collimator lens module). The present invention can adequately mix the blue light and the yellow light to effectively increase intensity uniformity of a projection picture of the projector.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector comprising:
    a light source adapted to emit a first beam;
    a collimator lens module having a first part and a second part divided by an axle, the first beam passing through the first part;
    a wavelength conversion module adapted to receive the first beam from the first part, the wavelength conversion module having a reflecting plate and a wavelength conversion layer, and the wavelength conversion layer being an annular structure disposed on the reflecting plate;
    a first dichroic unit disposed opposite to the first part of the collimator lens module, the first dichroic unit being adapted to reflect the first beam toward the reflecting plate or the wavelength conversion layer via the first part, the reflecting plate being adapted to reflect the first beam for generating a second beam passing through the second part, and the wavelength conversion layer being adapted to be excited by the first beam for generating a third beam passing through the first part and the second part of the collimator lens module and the first dichroic unit; and
    a second dichroic unit disposed opposite to the second part of the collimator lens module, the second dichroic unit being adapted to allow passing of the third beam and a part of the second beam for generating a fourth beam, and further to reflect the other part of the second beam for generating a fifth beam, the fifth beam being reflected by the first dichroic unit;
    wherein, a virtual line connected between a center of the first dichroic unit and a center of the second dichroic unit is perpendicular to the axle of the collimator lens module.

2. The projector of claim 1, wherein a first proportion of the second beam passes through the second dichroic unit, and a second proportion of the second beam is reflected by the second dichroic unit, and the first proportion is the same as or different from the second proportion.

3. The projector of claim 1, further comprising:
    a first light condensing module disposed between the light source and the first dichroic unit, and adapted to condense a projection dimension of the first beam.

4. The projector of claim 1, further comprising:
    a light receiver adapted to receive the third beam, the fourth beam and the fifth beam; and
    a second light condensing module disposed between the light receiver, the first dichroic unit and the second dichroic unit.

5. The projector of claim 1, wherein the first dichroic unit and the second dichroic unit are two independent optical components.

6. The projector of claim 1, wherein the first dichroic unit and the second dichroic unit are respectively disposed on two opposite surfaces of one optical component.

7. The projector of claim 1, wherein an included angle between the first dichroic unit and the second dichroic unit is smaller than a predefined angle.

8. The projector of claim 1, wherein the collimator lens module comprises at least one aspheric mirror.

9. The projector of claim 1, wherein the first beam, the second beam and the fifth beam are blue light, and the third beam is yellow light.

10. The projector of claim 9, wherein the first dichroic unit reflects the blue light and allows passing of other color light, and the second dichroic unit reflects a part of the blue light and allows passing of the other part of the blue light and other color light.

11. The projector of claim 1, wherein the axle of the collimator lens module is a central axle of the collimator lens module.

12. The projector of claim 1, wherein the wavelength conversion layer is set around a center of the reflecting plate to form the annular structure.

13. The projector of claim 1, wherein the wavelength conversion module is a rotatable module.

14. A projector comprising:
    a light source adapted to emit a first beam;
    a collimator lens module having a first part and a second part divided by an axle, the first beam passing through the first part;
    a wavelength conversion module adapted to receive the first beam from the first part, the wavelength conversion module having a reflecting plate and a wavelength conversion layer, and the wavelength conversion layer being an annular structure disposed on the reflecting plate;
    a first dichroic unit facing toward the first part of the collimator lens module, the first dichroic unit being adapted to reflect the first beam toward the reflecting plate or the wavelength conversion layer via the first part, the reflecting plate being adapted to reflect the first beam for generating a second beam passing through the second part, and the wavelength conversion layer being adapted to be excited by the first beam for generating a third beam passing through the first part and the second part of the collimator lens module and the first dichroic unit; and
    a second dichroic unit facing toward the second part of the collimator lens module, the second dichroic unit being adapted to allow passing of the third beam and a part of the second beam for generating a fourth beam, and further to reflect the other part of the second beam for generating a fifth beam, the fifth beam being reflected by the first dichroic unit;
    wherein the first dichroic unit and the second dichroic unit are respectively disposed on two opposite surfaces of one optical component in a partial interlaced manner.

15. The projector of claim 14, wherein a first proportion of the second beam passes through the second dichroic unit, and a second proportion of the second beam is reflected by the second dichroic unit, and the first proportion is the same as or different from the second proportion.

16. The projector of claim 14, further comprising:
a light receiver adapted to receive the third beam, the fourth beam and the fifth beam; and
a second light condensing module disposed between the light receiver, the first dichroic unit and the second dichroic unit.

17. The projector of claim 14, wherein the first dichroic unit reflects blue light and allows passing of other color light, and the second dichroic unit reflects a part of the blue light and allows passing of the other part of the blue light and other color light.

18. The projector of claim 14, wherein the axle of the collimator lens module is a central axle of the collimator lens module.

19. The projector of claim 14, wherein the wavelength conversion layer is set around a center of the reflecting plate to form the annular structure.

20. The projector of claim 14, wherein the wavelength conversion module is a rotatable module.

* * * * *